United States Patent Office 3,249,971
Patented May 10, 1966

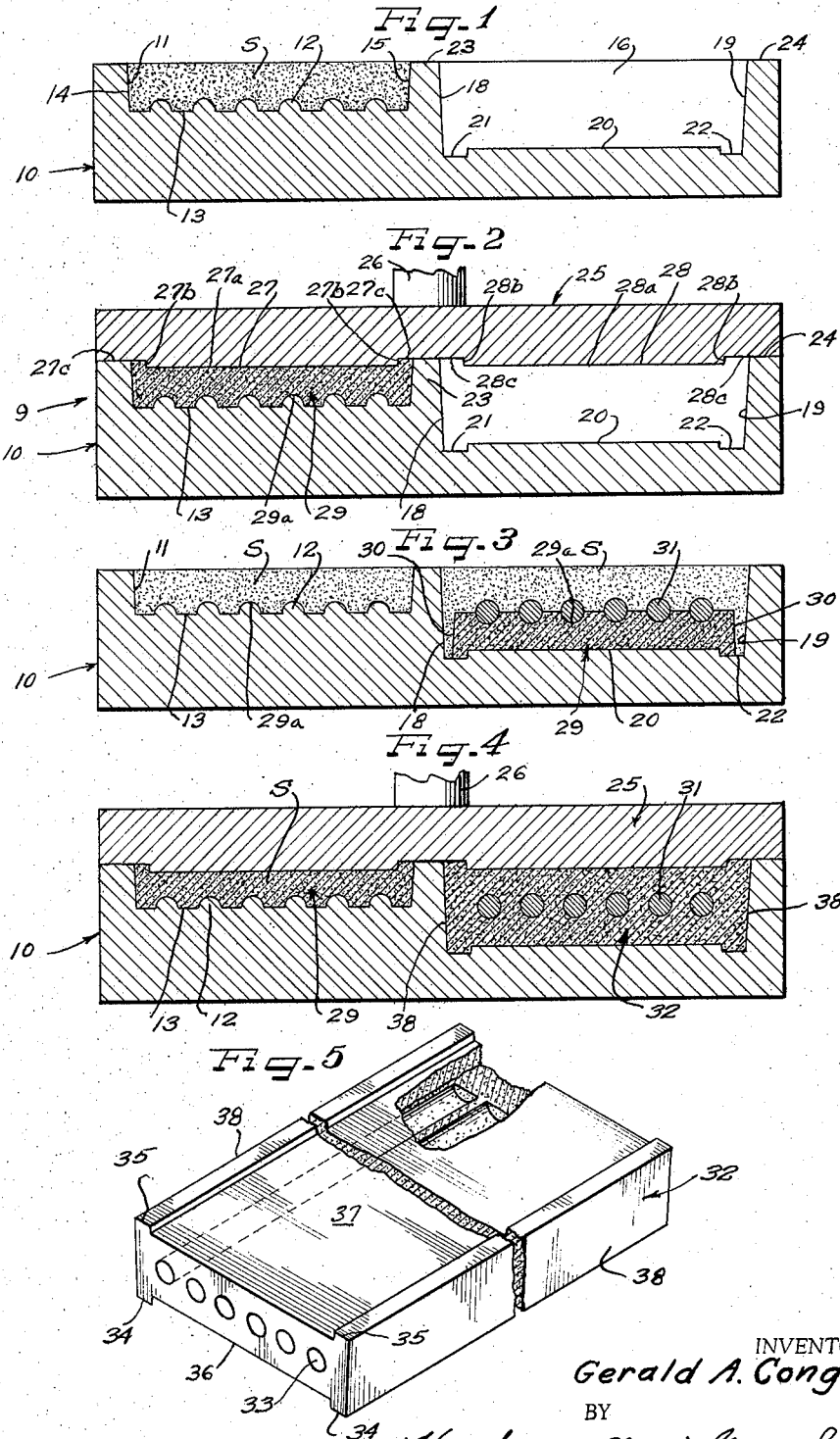

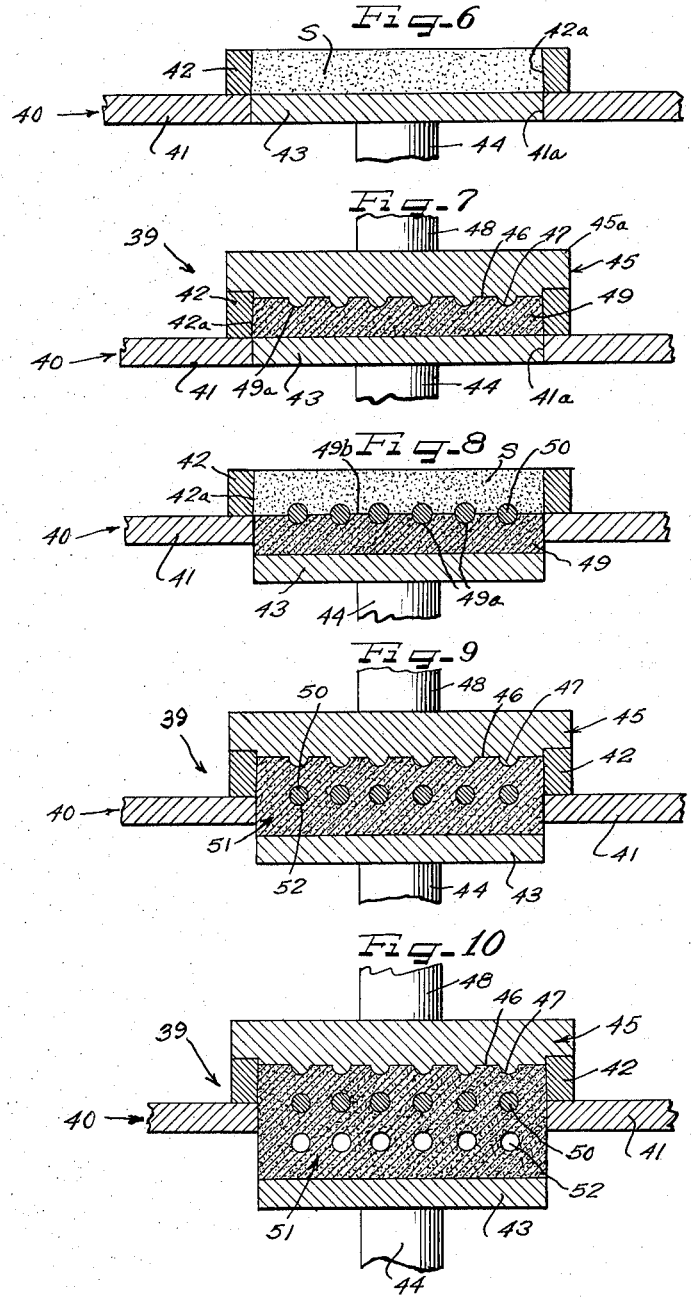

3,249,971
MOLDING PROCESS FOR MANUFACTURE OF
CAST BARS
Gerald A. Conger, De Kalb, Ill., assignor to
Barber-Greene Company
Filed May 22, 1963, Ser. No. 282,280
6 Claims. (Cl. 22—193)

The present invention relates to a new method of forming molds out of thermo-setting sand. More particularly, the present invention relates to a method for forming molds of the aforesaid type having seamless cavities therein whereby bars and rods and other articles can be poured into the molds and formed to shape without the development of any flash thereon as customarily results from the use of conventional types of molds. The present invention further relates to a new and improved seamless one-piece mold comprised of thermo-setting sand having cavities therein for casting flashless bars, rods and other articles therein.

In the past, it has been common for bars, rods and similar articles to be formed in cavities provided in two-piece molds having a parting line extended transversely of the cavities. Where bars and rods are cast in molds formed from two-piece molds of this type, it is common for flash to be cast on the bars or rods as a result of metal flowing into the crevice at the parting line between the molds. Where bars and rods are produced having flash, it is necessary that the flash be removed which increases the cost of manufacturing the articles. In addition, the metal wasted in producing flash on the bars increases the cost of manufacture of bars and rods, particularly where more expensive type metals are being used such as when certain types of welding rods are being cast.

According to the process herein described, molds can be manufactured having seamless cavities which preclude the formation of flash on articles formed in the mold cavities.

It is therefore an important object of this invention to provide a new and improved method of forming molds out of thermo-setting sand having seamless cavities therein to permit articles to be formed free of flash.

According to important features of this invention, there is provided a method of forming molds out of thermo-setting sand. This method includes the steps of first forming a half mold with semi-circular elongated cavities out of cured thermo-setting sand, inserting cylindrical rods in said cavities, forming the other half of the mold over said cavities and rods therein out of cured thermo-setting sand using the rods to form matching semi-circular cavities in registry with the first mentioned cavities, and then pulling the rods endwise out of the molded cylindrical cavities to form a mold.

According to still other important features of this invention, there is provided a method of manufacturing a seamless mold including the steps of confining a first mass of thermo-setting coated sand, compacting the sand while contemporaneously forming a series of elongated bar-shaped depressions in a surface of the sand, curing the sand, laying a series of bars in the depressions with surfaces of the bars projecting out of the depressions, confining a second mass of thermo-setting coated sand over the bars, compacting and curing the thermo-setting sand uniting the second mass of sand with the first mass of sand forming seamless bar-shaped mold cavities between the masses of sand, and removing the bars from the thus formed seamless mold.

Still another important feature of this invention involves the building up of successive molds on the molds previously described as the molds are completed so that an integrated one-piece mold can be manufactured having a series of rows of cylindrical cavities formed therein.

Other objects and features of the present invention will more fully become apparent in view of the following detailed description, taken in conjunction with the accompanying drawings illustrating therein several embodiments and in which:

FIGURE 1 is a vertical section of a bottom pattern having thermo-setting sand in one cavity;

FIGURE 2 is a vertical section similar to FIGURE 1 only illustrating the method of pressing the sand to form a lower half of a mold;

FIGURE 3 is a vertical section similar to FIGURE 2 only illustrating the lower half of the cured mold turned over and disposed in adjacent pattern cavity and with additional sand being disposed within the cavity with the cylindrical rods inserted;

FIGURE 4 is a vertical section similar to FIGURE 3 illustrating the technique for compacting the sand for forming a seamless mold while forming a lower half of a mold as shown in FIGURE 2;

FIGURE 5 is a perspective view of a mold formed from the pattern cavity shown in FIGURE 4;

FIGURE 6 is a vertical section of a modified process for forming a mold with sand being disposed within a cavity provided by a pattern;

FIGURE 7 is a vertical section similar to FIGURE 6 only illustrating the method of compacting the sand to form a lower portion of a pattern;

FIGURE 8 is a vertical section similar to FIGURE 7 with rods being disposed in rod cavities formed in the manner illustrated in FIGURE 7 and with additional sand being confined within the pattern on top of the rods;

FIGURE 9 is a vertical section similar to FIGURE 8 only illustrating the manner in which the sand is compacted to form a seamless foundry mold; and FIGURE 10 is a vertical section similar to FIGURE 9 illustrating the manner by which a second row of cavities can be formed in integrated assembly with the mold shown in FIGURE 9.

As shown on the drawings:

The reference numeral 9 in FIGURE 2 indicates generally a mold forming apparatus. This apparatus includes a lower mold forming unit 10 having a mold receiving cavity 11. The cavity 11 is provided with a series of semi-circular rib-like projections 12 on bottom wall 13 and is further defined by tapered cavity side walls 14 and 15.

A second cavity 16 is disposed adjacent the cavity 11 which second cavity is deeper so that a greater amount of sand can be received therein. The cavity 16 is defined by tapered side walls 18 and 19 which terminate at lower ends in a bottom surface 20 and more particularly define portions of leg-forming grooves or recesses 21 and 22.

The cavities 11 and 16 are separated from one another by a partition 23. The lower mold forming unit 10 is further provided with a relatively flat upper surface 24 on which an upper mold forming unit 25 is supported when the units 10 and 25 are disposed in closed relation. The upper mold forming unit 25 may be actuated by a ram 26.

The upper mold forming unit includes forming surfaces 27 and 28 which surfaces are joined together over the partition 23. The surfaces 27 and 28 include generally horizontal flat surface portions 27a and 28a which each terminate at opposite ends in spaced relation to the tapered side walls defining the associated lower sand receiving cavity. Joined with the flat surface portions 27a and 28a is a series of slightly tapered surface portions 27b, 27b; 28b, 28b which in turn terminate in essentially horizontal surface portions 27c, 27c; 28c, 28c.

The apparatus 9 may be operated by pouring sand S pre-coated with a resin for use in the "shell molding"

process. This material comprises a mixture of sand and powdered resin, and when required, a powdered resin curing or accelerating agent may be applied against the face of a heated metal mold surface such as designated at 27 and 28. A phenol-formaldehyde resin is satisfactory, examples of which are commercially available as BRR 5655 produced by Union Carbide Plastics Company, a division of Union Carbide Corporation, and 19207 Durez, a product of Durez Plastics Division, Hooker Chemical Company of Tonawanda, New York.

After the sand S is poured into the cavity 11 the ram 26 is actuated to cause the upper mold forming unit 25 to be pressed against the lower mold forming unit 10, compacting the sand about the semi-circular ribs 12. The shape of the ribs may be varied depending upon the shape of the mold cavity to be produced. As an example, the semi-circular shaped ribs 12 can be rectangularly shaped or shaped in some other form as desired. After the sand S is compacted, the apparatus 9 is heated causing the resin coated sand to be cured to form a cured resin coated sand mold section 29. The upper unit 25 is then moved away from the lower unit 10 and it is removed from the cavity 11 and turned upside down and placed in the cavity 16 as shown in FIGURE 3. The molded section 29 may be removed while hot or cold, as desired although generally the molds are removed from the hot equipment in a hot condition. It is not necessary that the molds be cooled for a bond or firming of the mold to occur, rather polymerization occurs at temperature. Generally, the pattern boxes are continuously heated, held at temperature, and only cooled when the pattern boxes are to be shut down. The section 29 has tapered sides 30, 30 which are spaced from cavity side walls 18 and 19 when inserted therein (FIGURE 3).

A series of metal rods 31 are then disposed within semi-circular cavities 29a provided in the section 29. Additional sand S is then poured into the cavities 11 and 16 as shown in FIGURE 3. The sand fills the space between the tapered sides 30, 30 on the cured half mold 29 and the cavity side walls 18 and 19. The upper mold forming unit 25 is then actuated in the same manner as previously described to cause another mold section 29 to be produced while simultaneously forming and bonding the uncured sand disposed in the cavity 16 with the previously formed mold section 29. When the resin coated sand is heated by heating the apparatus 9, the resin is caused to take a set and a unitary seamless mold 32 is produced. The mold 32 is stripped from the cavity 16 after the upper and lower units 25 and 10 are separated.

In FIGURE 5, the seamless mold 32 is shown in detail. The mold 32 is provided with a row of longitudinally extending seamless mold cavities 33 which cavities have bottoms (FIGURE 5). The cavity bottoms may be formed by spacing the ends of the ribs 12 from one side of the lower mold forming unit 10. Then the rods 31 are engaged against the bottoms of the semi-circular cavities during the steps described and illustrated in FIGURE 3. The mold 32 also has legs 34, 34 and 35, 35 on opposite sides which extend outwardly from essentially flat lower and upper mold walls 36 and 37. The mold further has tapered side walls 38.

Shown in FIGURE 7 is a modified apparatus for manufacturing a mold 51 having seamless cavities 52, which mold is illustrated in FIGURE 10.

The apparatus 39 includes a lower mold forming unit 40 having a platform 41 supporting a mold side wall 42. A cavity 41a is provided in the platform 41 and a movable cavity bottom 43 is disposed within the cavity 41a. The movable cavity bottom 43 is actuatable by means of a ram designated at 44.

The apparatus 39 further includes an upper mold forming unit 45 having a plate 45a. The plate 45a is provided with a bottom surface 46 having a series of transversely spaced longitudinally extending semi-circular rib-like portions 47. An upper surface of the unit 45 is connected to a ram 48 which controls the movement of the unit 45 towards and away from the lower mold forming unit 40.

In the operation of my apparatus 39 and in accordance with the method disclosed herein, a cavity 42a defined by the wall 42 and the bottom 43 of the lower mold forming unit 40 is filled with uncured thermosetting sand S as shown in FIGURE 6. Thereafter, the upper mold forming unit 45 is pressed against the sand to compact the sand and to form semi-circular depressions 48a in a half mold 49. At least one of the units 40 and 45 is heated in order to cause the half mold 49 to be cured.

After the half mold unit 49 is cured, the lower ram 49 is actuated to cause the platform 43 to drop a distance sufficient to position an upper surface 49b of the mold 49 in the same plane as the upper surface of the mold supporting member 41. Circular rods 50 are then placed into the semi-circular grooves 49a and the cavity defined by the walls 42 is filled with thermo-setting sand S. The upper mold forming unit 45 is actuated again and the material in the mold cavity is cured to complete the formation of a seamless mold 51 having rows of transversely spaced cavities 52 in which welding rods and other objects may be cast depending on the configuration of the seamless cavities 52. When the unit 45 is actuated another row of semi-circular grooves 49a are formed also. The rods 50 are removed from the cavities 52 by drawing them lengthwise out of the mold 51.

If it is desired to form another row of cavities 52 on the mold 51, the ram 44 is actuated to cause the platform 43 to drop a distance corresponding to the height of the wall 42. Thereafter, the steps illustrated in FIGURE 8 are repeated whereby pattern rods 49a are placed into the semi-circular cavities and sand S is poured on top of the pattern rods and into the cavity defined by the rectangularly arranged walls 42 defining the rectangular cavity 42a. After the thermo-setting sand has been cured, the pattern rods 50 are drawn from the open ends of the cavities 52 formed in the mold. Opposite ends of the cavities are closed to permit metal to be cast therein in the same way as shown in FIGURE 5.

It is significant to note the mold 51 is characterized by having the mold cavities 52 which extend essentially the full length of the mold 51. Due to the bonding characteristics of the thermo-setting resin coated sand, where thermo-setting resin coated sand is heated and cured on a half mold as identified at 49 in FIGURE 8, a seamless mold 51 of the type shown in FIGURE 10 may be produced. Each of the cavities 52 is transversely defined by having a continuous uninterrupted circular or square surface which is endless. The cavities 52 may be elliptical or square-shaped or shaped in any suitable manner and it will be appreciated the semi-circular shaped rib portions 47 on the upper die unit 45 may be changed in accordance with the type of welding rod or other article that is to be produced by the apparatus 39. In any case, after the seamless mold 51 is manufactured, the pattern rods 50 are removed from the mold 51 as described above.

Although minor modifications might be suggested by those versed in the art, it should be understood that I wish to embody within the scope of the patent warranted hereon, all such modifications as reasonably and properly come within the scope of my contribution to the art.

I claim as my invention:

1. In a method of forming molds out of cured thermosetting sand, the steps of first molding a half mold with semi-circular elongated cavities, heating and curing the half mold, inserting cylindrical rods in said cavities, molding the other half of the mold over the cavities and rods therein using the rods to form matching semi-circular cavities registering with the first mentioned cavities, heating and curing the other half mold and joining the halves in integrated inseparable unitary assembly forming seamless molded cavities, then pulling the rods endwise out of the molded cavities to form a mold and building up successive molds in the same manner as the previously formed completed mold so as to form an integrated one-piece mold with a series of rows of cylindrical cavities one above the other.

2. A method of manufacturing a mold, the steps of confining a first mass of thermo-setting resin coated sand, compacting the sand while contemporaneously forming a series of depressions in a surface of the sand and curing the sand, laying a series of bars in the depressions with surfaces of the bars projecting out of the depressions, confining a second mass of thermo-setting resin coated sand over the bars, compacting and curing the thermo-setting resin coated sand uniting the second mass of sand with the first mass of sand forming seamless mold cavities between the masses of sand, pulling the bars endwise from the cavities of the thus formed seamless mold, continuing to build up successive molds in the same manner as the previously formed completed mold so as to form an integrated one-piece mold wtih a series of rows of cylindrical cavities one above the other.

3. A method of manufacturing a mold, the steps of confining a first mass of thermo-setting resin coated sand, forming a series of elongated depressions in a surface of the sand with the depressions extending only to one of the confined sand, compacting the sand while contemporaneously curing the sand, laying a series of bars in the depressions with surfaces of the bars projecting out of the depressions, confining a second mass of thermo-setting resin coated sand over the bars, compacting and curing the thermo-setting resin coated sand uniting the second mass of sand with the first mass of sand forming seamless mold cavities between the masses of sand, pulling the bars endwise from the cavities of the thus formed seamless mold with the cavities being open at one end of the mold and each having a bottom at an opposite end, and continuing to build up successive molds in the same manner as the previously formed completed molds so as to form an integrated one-piece mold with a series of rows of bar cavities one above the other.

4. A method of manufacturing a mold, the steps of confining a first mass of thermo-setting resin coated sand, forming a series of generally horizontal elongated depressions in a surface of the sand with the depressions extending only to one end of the confined sand, compacting the sand while contemporaneously curing the sand, laying a series of bars in the horizontal depressions with surfaces of the bars projecting out of the depressions, confining a second mass of thermo-setting resin coated sand over the bars, compacting and curing the thermo-setting resin coated sand uniting the second mass of sand with the first mass of sand forming horizontally disposed seamless mold cavities between the masses of sand, continuing to build up successive molds in the same manner as the previously formed mold so as to form an integrated one-piece stacked type mold with a series of rows of bar cavities one above the other, the bars having been extracted by pulling them endwise from the cavities of the thus formed seamless mold with the cavities being open at one end of the mold and each having a bottom at an opposite end.

5. A method of manufacturing a mold, the steps of confining a first mass of thermo-setting resin coated sand, forming a series of generally horizontal elongated depressions in a surface of the sand with the depressions extending only to one end of the confined sand, compacting the sand while contemporaneously curing the sand, laying a series of bars in the horizontal depressions with surfaces of the bars projecting out of the depressions, confining a second mass of thermo-setting resin coated sand over the bars, compacting and curing the thermo-setting resin coated sand uniting the second mass of sand with the first mass of sand forming horizontally disposed seamless mold cavities between the masses of sand, lowering the horizontally disposed cavities with the thus formed mold, continuing to build up successive molds on top of the first formed mold in the same manner as the previously formed mold so as to form an integrated one-piece stacked type mold with a series of rows of horizontal cavities one above the other, the bars having been extracted by pulling them endwise from the cavities with the cavities each being open at one end and having a bottom at an opposite end.

6. A method of manufacturing a stack type mold, the steps of confining a first mass of thermo-setting resin coated sand, forming a series of generally horizontal depressions in a surface of the sand, compacting the sand while contemporaneously curing the sand, laying a series of patterns in the horizontal depressions with surfaces of the patterns projecting out of the depressions, confining a second mass of thermo-setting resin coated sand over the patterns, compacting the second mass of thermo-setting resin coated sand while contemporaneously forming a new series of generally horizontal depressions in an upper surface of the second mass of thermo-setting resin coated sand, curing the thermo-setting resin coated sand uniting the second mass of sand with the first mass of sand forming horizontally disposed seamless mold cavities between the masses of sand, inserting patterns into the cavities in the second mass of thermo-setting resin coated sand, and continuing to build up successive molds in the same manner as the previously formed completed mold so as to form an integrated one-piece stack type mold with a series of rows of cavities one above the other.

References Cited by the Examiner

UNITED STATES PATENTS

| | | | |
|---|---|---|---|
| 511,393 | 12/1893 | Wrigley | 22—199 |
| 665,989 | 1/1901 | Bechtold | 18—59 |
| 697,948 | 4/1902 | McCleary | 22—101 |
| 709,768 | 9/1902 | Hodges | 22—158 |
| 955,021 | 4/1910 | Van Buren | 22—101 |
| 1,115,905 | 11/1914 | Curl | 22—101 |
| 1,526,116 | 2/1925 | Casey. | |
| 1,535,274 | 4/1925 | Welch | 25—130 |
| 1,653,232 | 12/1927 | Smith | 22—130 |
| 1,706,305 | 3/1929 | Lyne | 25—101 |
| 1,827,549 | 10/1931 | Villain | 18—59 |
| 1,939,894 | 12/1933 | Goodwin | 18—30 |
| 2,922,207 | 1/1960 | Radu | 22—193 |
| 2,923,988 | 2/1960 | Baker | 22—193 |
| 2,940,142 | 6/1960 | Wells et al. | 22—130 |
| 3,077,648 | 2/1963 | Sutherland | 22—193 |

FOREIGN PATENTS 265,365  2/1927  Great Britain.

J. SPENCER OVERHOLSER, *Primary Examiner.*

ROBERT F. WHITE, *Examiner.*